United States Patent
Narayanan et al.

(10) Patent No.: US 8,660,226 B2
(45) Date of Patent: Feb. 25, 2014

(54) SYSTEMS AND METHODS FOR MULTICHANNEL NOISE REDUCTION

(75) Inventors: Suresh Narayanan Narayanan, Waukesha, WI (US); Naveen Stephan Chandra, Kenosha, WI (US); Jiahua Fan, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 13/009,469

(22) Filed: Jan. 19, 2011

(65) Prior Publication Data

US 2012/0183108 A1 Jul. 19, 2012

(51) Int. Cl.
*H04B 1/10* (2006.01)
*G06K 9/00* (2006.01)

(52) U.S. Cl.
USPC .......................................... 375/350; 382/131

(58) Field of Classification Search
USPC ......... 375/260, 267, 340, 343, 346, 349, 350; 378/4; 385/128, 131, 132; 382/128, 382/131, 132

See application file for complete search history.

(56) References Cited

U.S. PATENT DOCUMENTS

| | | | |
|---|---|---|---|
| 5,821,541 A | 10/1998 | Tümer | |
| 6,545,472 B2 * | 4/2003 | Prussmann et al. | 324/307 |
| 6,816,564 B2 * | 11/2004 | Charles et al. | 378/5 |
| 7,180,074 B1 | 2/2007 | Crosetto | |
| 7,545,910 B2 | 6/2009 | Harding et al. | |
| 7,868,665 B2 | 1/2011 | Tumer et al. | |
| 2001/0053202 A1 * | 12/2001 | Mazess et al. | 378/196 |
| 2009/0060135 A1 | 3/2009 | Morton | |
| 2009/0072156 A1 | 3/2009 | Chinn et al. | |
| 2010/0303287 A1 | 12/2010 | Morton | |
| 2011/0077542 A1 * | 3/2011 | Tseng et al. | 600/515 |
| 2012/0092009 A1 * | 4/2012 | Zhang et al. | 324/309 |

OTHER PUBLICATIONS

W.A. Kalender, et al., An Algorithm for Noise Suppression in Dual Energy CT Material Desity Images, IEEE Transactions on Medical Imaging, vol. 7, No. 3, Sep. 1988.

* cited by examiner

*Primary Examiner* — David B. Lugo
(74) *Attorney, Agent, or Firm* — The Small Patent Law Group; Dean D. Small

(57) ABSTRACT

Systems and methods for multichannel noise reduce are provided. One method includes acquiring a multichannel signal, obtaining a noise correlation between a plurality of channels of the multichannel signal, and obtaining a signal characteristic in each of the plurality of channels. The method also includes removing signal noise based on (i) the correlated noise and (ii) at least one of an uncorrelated noise in each channel or the obtained signal characteristic in each channel.

23 Claims, 12 Drawing Sheets

NO EDGE

ORIGINAL

NOISE REDUCED

EFFICIENCY OF NOISE REDUCTION

SYSTEMS AND METHODS FOR MULTICHANNEL NOISE REDUCTION

BACKGROUND OF THE INVENTION

The subject matter disclosed herein relates generally to systems and methods for noise reduction, and more particularly to systems and methods for multichannel noise reduction.

In diagnostic imaging systems, good image quality is desirable, such as to provide images with clinically relevant information. For example in a x-ray system, data may be processed to reduce noise, thereby improving image quality. This improvement in image quality is typically achieved by reducing the discrepancy between a true attenuation value and the measured value. In a Computed Tomography (CT) system, for a basic reconstruction, approximately 1000 projections are used, where a single projection contains over 1000 measurements within a single x-ray spectrum. Thus, the noise in multichannel imaging systems is even more complex as noise is contributed by each channel. Moreover, the noise is not localized when multiple x-ray spectra are utilized for collecting the projection data.

In conventional systems using multichannel signals, in order to reduce noise it is important to preserve a signal characteristic in the multichannel signals where the signal characteristic exists in one channel signal and may be absent in another signal channel. Using conventional noise reduction methods, these differences introduce artifacts. Additionally, conventional noise reduction methods contaminate the channel signal, particularly the signal which lacks the signal characteristic being preserved.

BRIEF DESCRIPTION OF THE INVENTION

In accordance with an embodiment, a method for multichannel noise reduction is provided. The method includes acquiring a multichannel signal, obtaining a noise correlation between a plurality of channels of the multichannel signal, and obtaining a signal characteristic in each of the plurality of channels. The method also includes removing signal noise based on (i) the correlated noise and (ii) at least one of an uncorrelated noise in each channel or the obtained signal characteristic in each channel.

A multichannel system and a computer readable storage medium for reducing signal noise in a multichannel system using a processor are also provided that implement the multichannel noise reduction method.

BRIEF DESCRIPTION OF THE DRAWINGS

The drawings illustrate generally, by way of example, but not by way of limitation, various embodiments discussed in the present document.

DETAILED DESCRIPTION OF THE INVENTION

Figure 1:
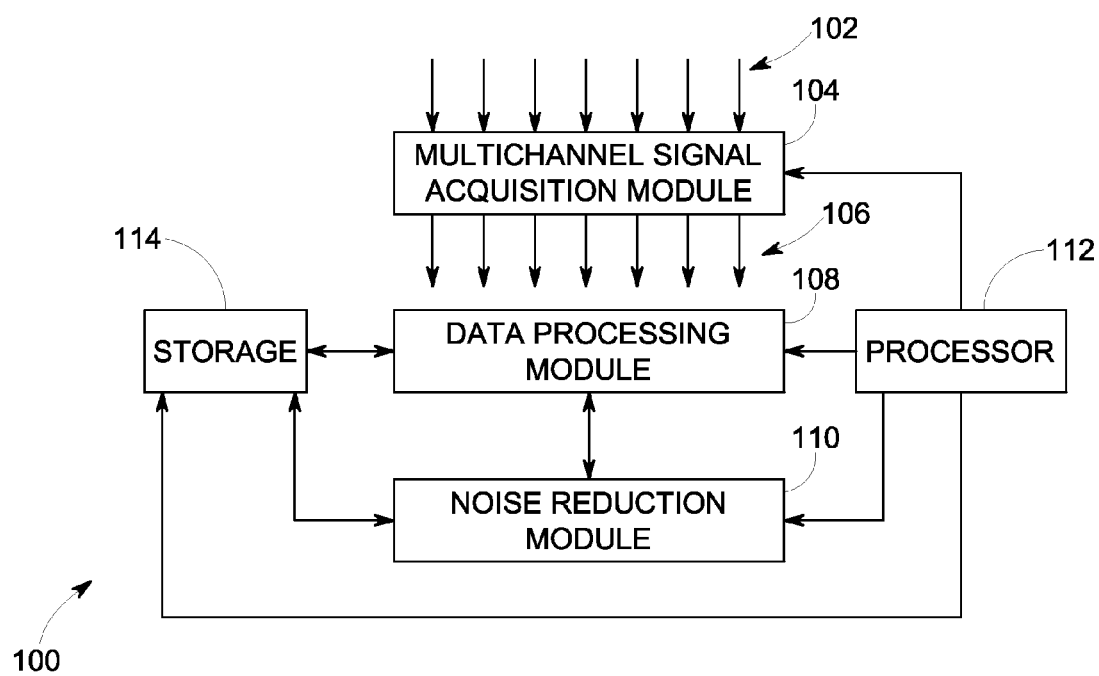
FIG. 1 is a simplified block diagram of multichannel system having a noise reduction module in accordance with an embodiment.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the subject matter disclosed herein are not intended to be interpreted as excluding the existence of additional embodiments that also incorporate the recited signal characteristics. Moreover, unless explicitly stated to the contrary, embodiments "comprising" or "having" an element or a plurality of elements having a particular property may include additional such elements not having that property. Additionally, the recitation of a particular number of elements does not exclude embodiments having more than that particular number, unless the number is further qualified by words such as "exactly" or "only." Also, unless the possibility is either explicitly, logically or physically excluded, individual signal characteristics may be omitted from an embodiment, or one or more signal characteristics from another embodiment or other embodiments, may be combined to produce additional embodiments of the subject matter disclosed herein.

Hereinafter, the terms "subject" and "object" shall include anything capable of being imaged. Also as used herein, the phrase "reconstructing an image" is not intended to exclude embodiments of the subject matter disclosed herein in which data representing an image is generated, but a viewable image is not. Therefore, as used herein the term "image" broadly refers to both viewable images and data representing a viewable image. However, many embodiments generate (or are configured to generate) at least one viewable image. Additionally, although described in detail in a Computed Tomography (CT) medical setting, it is contemplated that the benefits accrue to all imaging modalities including, for example, ultrasound, Magnetic Resonance Imaging, (MRI), Electron Beam CT (EBCT), Positron Emission Tomography (PET), Single Photon Emission Computed Tomography (SPECT), and in both medical settings and non-medical settings such as an industrial setting or a transportation setting, such as, for example, but not limited to, a baggage scanning CT system for an airport or other transportation center.

FIG. 1 illustrates a block diagram of a multichannel system 100 having a noise reduction module in accordance with an embodiment. As illustrated, multiple signals 102 are acquired by a multichannel signal acquisition module 104. The acquired data (e.g., image data) is then transferred to a data processing module 108 via multiple channels 106. As used herein, the term data processing encompasses the processing of any data. For example the data being processed may be an image or a video signal. Alternatively, the data being processed may be a speech signal. Accordingly, in some embodiments the data processing module may be used to process data to reconstruct an image having reduced noise.

A noise reduction module 110 performs noise reduction as described herein, which in various embodiments, reduces correlated noise. The noise reduction module 110 may also be configured to reduce uncorrelated noise while using neighborhood estimates of noise. Additionally, the noise reduction module 110 is configured to preserve desired signal characteristic information in each channel.

A processor 112 may coordinate or control the operation of the system 100 based on a programmed instructions. The system 100 may also include a storage memory 114 to store, for example, original or raw data, processed data, additional instructions for the processor 112, etc. Alternatively, the noise reduction module 110 may be part of the data processing module 108 or may be part of the processor 112.

The system of FIG. 1 may be embodied as different types of systems. For example, the system of FIG. 1 may be a diagnostic spectral imaging system where material image pairs contain correlated and uncorrelated sources of noise. Alternatively, the system of FIG. 1 may be a fast kV switching CT scanner of a photon counting system. Alternatively, the system of FIG. 1 may be a PET or a SPECT imaging system. Accordingly, the various embodiments described herein are used generally for noise reduction in any multichannel system.

Further, the system 100 may be used to generate different types of images, for example, monochromatic images. The various embodiments also may be implemented in different applications including, but not limited to, speech processing in addition to the presently described application in CT.

Figure 2:
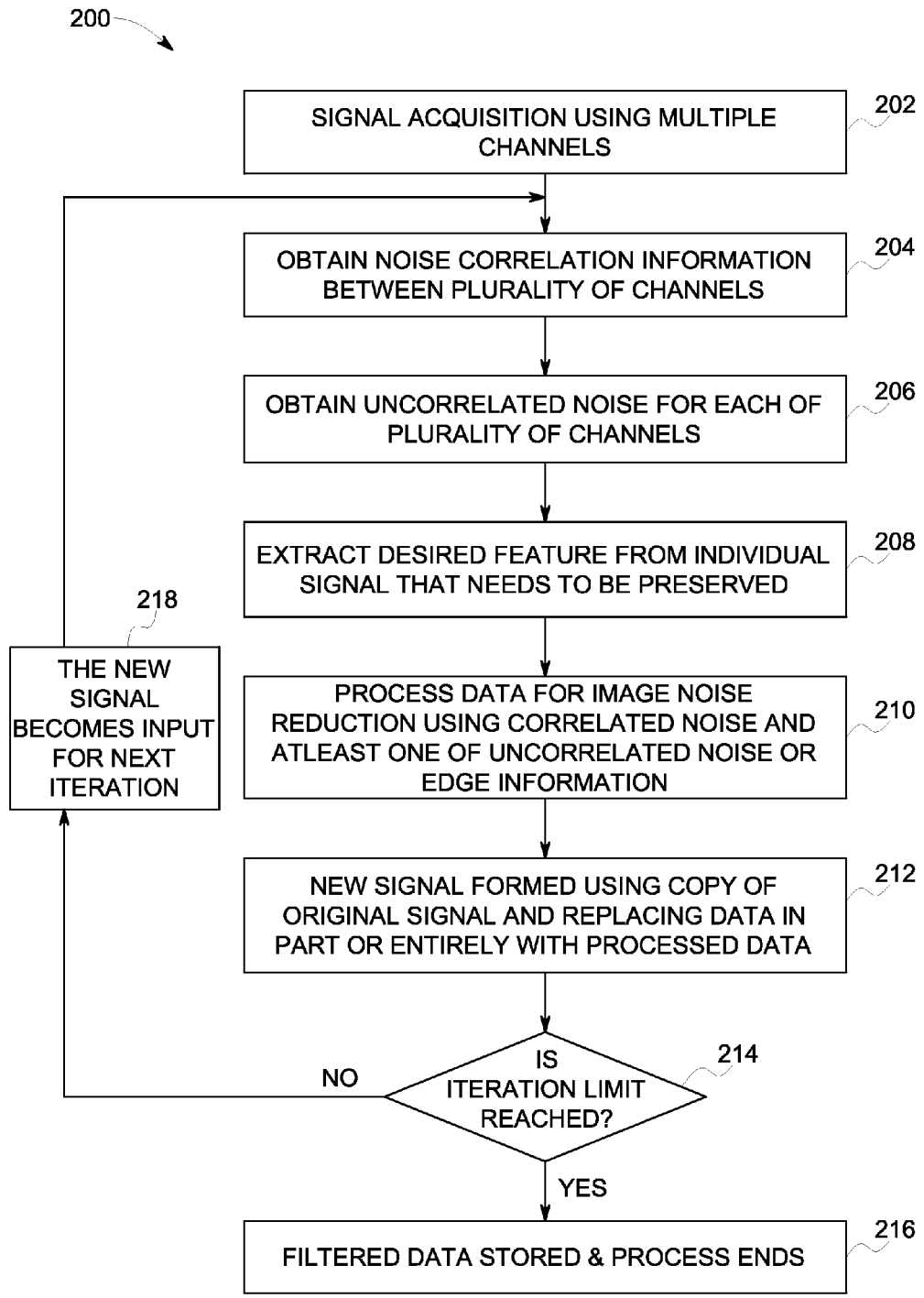
FIG. 2 is a flowchart of a method for noise reduction in accordance with an embodiment.

FIG. 2 is a flowchart of a method for noise reduction in accordance with an embodiment. It should be noted that not all steps described in the process of FIG. 2 may be performed in all embodiments or may be performed in a different order. The process 200 in various embodiments performs simultaneous (or concurrent) multichannel noise reduction. The following symbols are used herein and defined as follows:

x First signal containing noise
$\hat{x}$ First signal without noise
y Second signal containing noise
$\hat{y}$ Second signal without noise
$n_x$ Statistically independent noise source in first signal
$n_y$ Statistically independent noise source in second signal
$n_c$ Correlate noise between two signals in reference
k Scale on the correlated noise $\delta_{xs}$ Difference between the signal at a location and a neighbor in x such that $\delta_{xs}=x_t-x_{ts}$.
$\delta_{ys}$ Difference between the signal at a location and a neighbor in y such that $\delta_{ys}=y_t-y_{ts}$
$x_{ts}$ Value of neighbor/s to the current sample of signal x, after t updates
$y_{ts}$ Value of neighbor/s to the current sample of signal y after t updates.
$C_{ij}(s,t)$ Correlation coefficient at a spatial location s after t updates; where i and j refers to dimensions
$\hat{C}$ Correlation coefficient
$g_i(a,b)$ Feature preserving function.
$f_{ij}(C_{ij})$) The noise reduction function based on
$\Omega$ Neighbors at which an update is being made and
S Index of each neighbor in the neighborhood With particular reference to the process 200, at 202, multichannel signals are acquired. The signals may be, for example, any of an audio, a video, or an imaging signal, among others. The signals may be obtained from an acquisition system (e.g. CT scanner) during a current scan or may be obtained from stored data from a previous acquisition. Thereafter, at 204 correlated noise information is obtained in at least two channels. It should be noted that the correlated noise information may be obtained for more than two channels.

In one embodiment, the measured signal may be modeled as:

$$x=\hat{x}+n_x+n_c$$

$$y=\hat{y}+n_y+kn_c$$

The process 200 then iteratively solves for $\hat{x},\hat{y}$ as follows:

$$\begin{bmatrix}\hat{x}\\\hat{y}\end{bmatrix}=\lim_{t\to\infty}\begin{bmatrix}x_t\\y_t\end{bmatrix}$$

In one embodiment, the input signal may be used as initial starting point at 204 for the iterative process such that:

$$\begin{bmatrix}x_t\\y_t\end{bmatrix}=\begin{bmatrix}x\\y\end{bmatrix},\text{ for }t=0;$$

For example, at 204 $C_{ij}(s,t)$ may be calculated. Where $C_{ij}(s,t)$ is the correlation coefficient between channel i and channel j along the direction of s after t updates. For example, i and j may take values 1 and 2 when the update is being calculated for two signals. Alternatively, the correlation coefficient may be replaced by real correlation values. In one embodiment, $C_{ij}(s,t)$ may be computed as a local correlation estimate along direction s. Alternatively, in some embodiments, direction independent correlation may be used.

At 206, uncorrelated noise in each of the plurality of channels is obtained. For example, an uncorrelated noise may be a random signal with a flat power spectral density. Any suitable method for determining the uncorrelated noise may be used. For example, the uncorrelated random error in the data may be reduced using a principal component analysis (PCA) to determine the uncorrelated noise.

Next, at 208 a desired signal characteristic to be preserved (e.g., needs or desired to be preserved) in an individual channel is determined. In one embodiment, such signal characteristic may be an image edge. For example, $g_i(a,b)$ may include one or more preserving functions, such as an edge preserving function, a mean preserving function and/or a curvature preserving function. The function $g_t(a,b)$, in various embodiments, designed to preserve the edges, mean or curvature, may be any suitable edge preserving function, mean preserving function or curvature preserving function (e.g., preserve or retain the shape of an organ). However, it should be noted that one or more of any type of preserving function may be used, for example, any suitable mathematic metric corresponding to or related to a particular feature (e.g., a feature of the image) may be used.

For example, the function $g_t(a,b)$ ensures that the noise correction applied to regions of a signal or an image, where an edge is detected, is zero, while the correction applied to other regions is non-zero. Since the process allows noise reduction in a channel with edge information using the correlation information from the alternate channels, reduction in noise is achieved without distorting the edge or contaminating alternate channels with edge information where such edge is not present.

Additionally, $g_t(a,b)$ may perform smoothing and feature perseveration, which reduces, for example, spurious noise and unwanted artifacts while preserving small features that are indicative of real underlying structure. In one embodiment, this is achieved by applying a preservation filter to a signal or and image so as to prevent or reduce the corruption or degradation of the signal, such as related to structural differences, the composition of the corresponding area, or as a result of noise or error in the captured signal.

At 210, noise is reduced using the correlated noise obtained at 204 and may further include removing the uncorrelated noise obtained at 206, while preserving the desired signal characteristic in each channel as determined in 208. In particular, $f_{ij}(C_{ij})$ is a function based on correlation coefficient $C_{ij}$ after t updates. The function $f_{ij}(C_{ij})$ is designed to use correlation information. The correlation information may be determined based on input signals or images, such as acquired at 202. Alternatively, the correlation information may be based on an initial prediction. For example, the correlation information determined previously for signals in two channels may be used to determine a correlation coefficient ($\hat{C}$). In one embodiment, the function $f_{ij}(C_{ij})$ can then be defined based on this correlation coefficient such that the magnitude of update is large when $C_{ij}$ is close to $\hat{C}$. Additionally, in operation, $f_{ij}(C_{ij})$ may be converged to zero as the number of updates increases. Alternatively, the function $C_{ij}$ may be further processed prior to use in this process.

At 212, the original channel signal is updated with the signal processed for noise removal. For example, updating a signal may include replacing the original data with processed data. Alternatively, the updating may includes the addition, subtraction or multiplication of the original signal with the processed information. In an alternate embodiment, an update may be made to a copy of signal stored in memory 114. Thus, for each iteration, an update is made to the input signal. Different parameters may be used for noise reduction and may be tuned for controlling the update. For example, such tuning may involve defining the number of neighbors (e.g., neighbor or adjacent channels or pixels) used to calculate the update. Alternatively, the tuning may involve using $\delta_{xs}$ of a current signal at a specific location. Also, it should be noted that the correlation coefficient can be replaced with alternate measures of correlation. For example, the neighborhood cross correlation estimate may be used instead of the correlation coefficient. Alternatively, the correlation can be measured either along the direction from the current voxel to the neighbor ($s \in \Omega$) or can be direction independent.

Furthermore, the correlation may be based on a multi-dimensional calculation and the correlation coefficient may be an autocorrelation coefficient. The selection of correlation may change the number of updates used to converge to a final noise reduced image. In one embodiment, the iterative equation for an update may be defined as:

$$\begin{bmatrix} x_{t+1} \\ y_{t+1} \end{bmatrix} = \begin{bmatrix} x_t \\ y_t \end{bmatrix} + \sum_{s \in \Omega} \begin{bmatrix} f_{11}(C_{11}(s,t)) & f_{12}(C_{12}(s,t)) \\ f_{21}(C_{21}(s,t)) & f_{22}(C_{22}(s,t)) \end{bmatrix} \begin{bmatrix} g_1(\delta_{xs}, \delta_{ys})\delta_{xs} \\ g_2(\delta_{xs}, \delta_{ys})\delta_{ys} \end{bmatrix}$$

The noise reduction may be applied at multiple resolutions. For example, the noise reduction may be applied in a wavelet transform that generates an alternate representation of information. For example, the wavelet transform may be a Haar transform. The noise reduction also may be applied to a lower resolution component of the images and to remove correlated noise.

After an update is made at 212, a determination is made at 214 as to whether a maximum number of iterations have been reached (e.g., based on a maximum allowable value). If the maximum number of iterations has not been reached, the updated signal serves as an input for the next iteration at 218 and then the process 200 returns to 204.

Returning to 214, if a maximum number of updates have been reached, the filtered data is stored and the noise reduction process ends at 216.

It should be noted that the application of the various embodiments is not limited to a dual channel signal or computation in a signal dimension. Further, the noise reduction process of various embodiments is applicable to any signal that may be measured and modeled based on a signal and noise. Such noise may be system dependent, or the noise may be introduced from an independent source. The noise reduction process may also be extended to multiple channels and higher dimensions. For example, for three channels, the noise reduction equation may be defined as:

$$\begin{bmatrix} x_{t+1} \\ y_{t+1} \\ z_{t+1} \end{bmatrix} = \begin{bmatrix} x_t \\ y_t \\ z_t \end{bmatrix} +$$

$$\sum_{s \in \Omega} \begin{bmatrix} f_{11}(C_{11}(s,t)) & f_{12}(C_{12}(s,t)) & f_{13}(C_{13}(s,t)) \\ f_{21}(C_{21}(s,t)) & f_{22}(C_{22}(s,t)) & f_{23}(C_{23}(s,t)) \\ f_{31}(C_{31}(s,t)) & f_{32}(C_{32}(s,t)) & f_{33}(C_{33}(s,t)) \end{bmatrix} \begin{bmatrix} g_1(\delta_{xs}, \delta_{ys}, \delta_{zs})\delta_{xs} \\ g_2(\delta_{xs}, \delta_{ys}, \delta_{zs})\delta_{ys} \\ g_3(\delta_{xs}, \delta_{ys}, \delta_{zs})\delta_{xs} \end{bmatrix}$$

Thus, in the case of a one dimensional implementation, $\Omega$ includes two immediate neighbors. Alternatively, in the case of a two dimensional implementation, $\Omega$ includes eight neighbors. In alternate embodiment, a subset of these neighbors may be used. For example, in the case of a three dimensional implementation, $\Omega$ may include twenty six neighbors. The various embodiments disclosed herein allow using additional information regarding the correlations of multiple channels to control the amount of correlated and uncorrelated noise being reduced.

Figure 3:
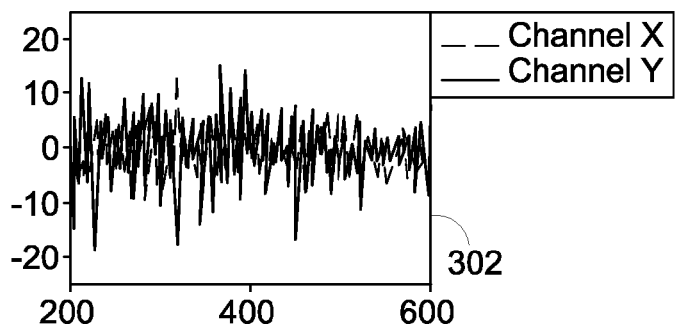
FIG. 3 are graphs illustrating noise reduction for dual channel signals without edge information.
Figure 3:
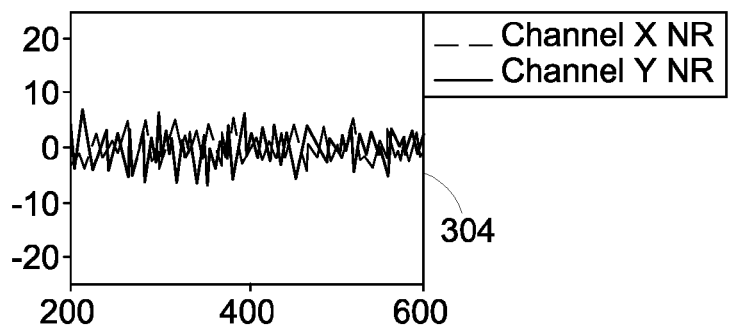
Figure 3:
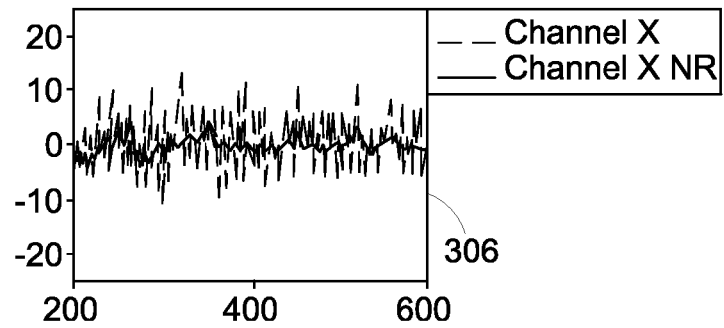

FIG. 3 are graphs illustrating noise reduction for dual channel signals without edge information. FIG. 3 demonstrates the implementation of the noise reduction process in one dimension. In particular, the image 302 shows the signals for two input channels x and y. In this case, there is no edge information in either channel. Accordingly, a spike in Channel X correlates to a spike in Channel Y. Such spikes represent a negatively correlated approximation of noise. The noise reduction process in accordance with various embodiments is applied to these two channels and the result is displayed in the image 304. The image 304 shows the two channels after noise reduction and as can be seen in the image 304 the correlated noise (previously shown as spiked) is significantly removed. The image 306 shows comparison of channel x before and after noise reduction further illustrating the noise reduction.

Figure 4:
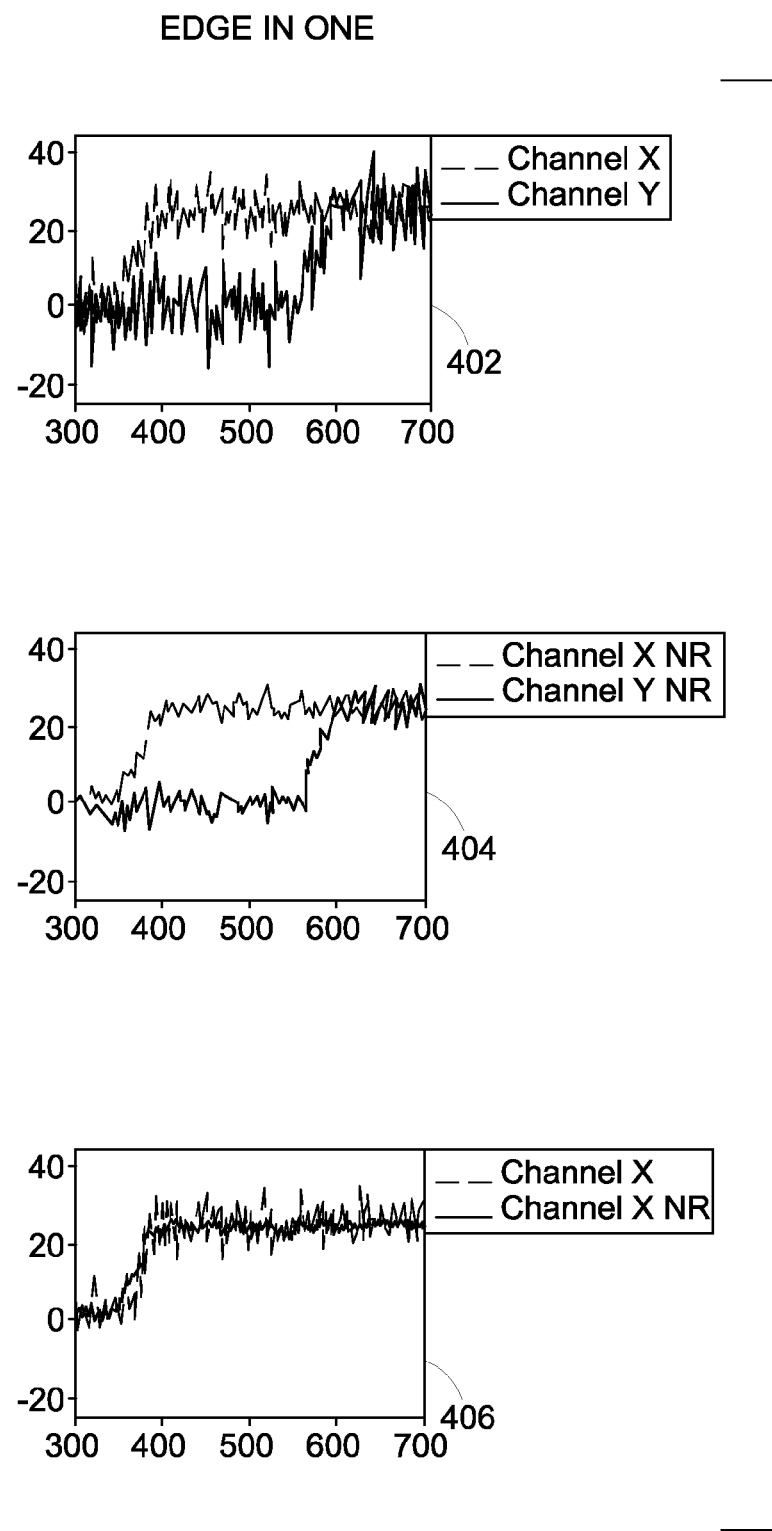
FIG. 4 are graphs illustrating noise reduction for dual channel signals with edge information in one of two channels.

FIG. 4 are graphs illustrating noise reduction for dual channel signals with edge information include in one of two channels. The image 402 shows the signals for two input channels x and y. The channel y signal has edge information represented by the rise of the channel y signal between 500 and 600 (on the horizontal axis). The image 404 shows the two channels after noise reduction using the noise reduction process of various embodiments. Since the process allows noise reduction in a channel with edge information using the correlation information from the alternate channels, reduction in noise is achieved without distorting the edge or contaminating alternate channels with edge information where such edge is not present. The image 406 shows comparison of channel x before and after noise reduction. As can be seen from the comparison, channel x was not contaminated with the edge information after noise reduction.

Figure 5:
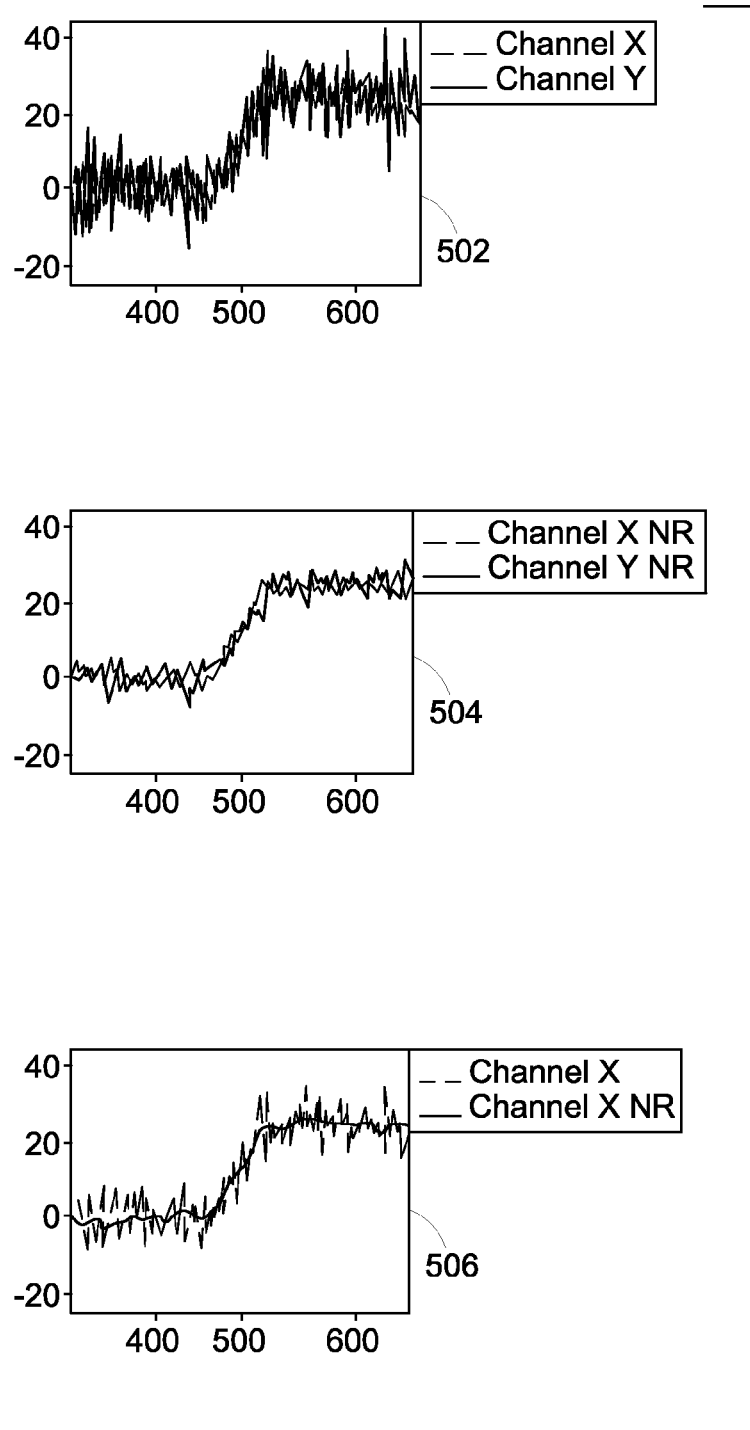
FIG. 5 are graphs illustrating noise reduction for dual channel signals with edge information in both channels.

FIG. 5 are graphs illustrating noise reduction for dual channel signals with edge information in both channels. The image 502 shows the signals for two input channels x and y with the same edge information in each channel. The image 504 shows the two channels after noise reduction using various embodiments. Since the process allows noise reduction in a channel with edge information using the correlation information from the alternate channels, the edge information is further accentuated. The image 506 shows a comparison of channel x before and after noise reduction.

Figure 6A:
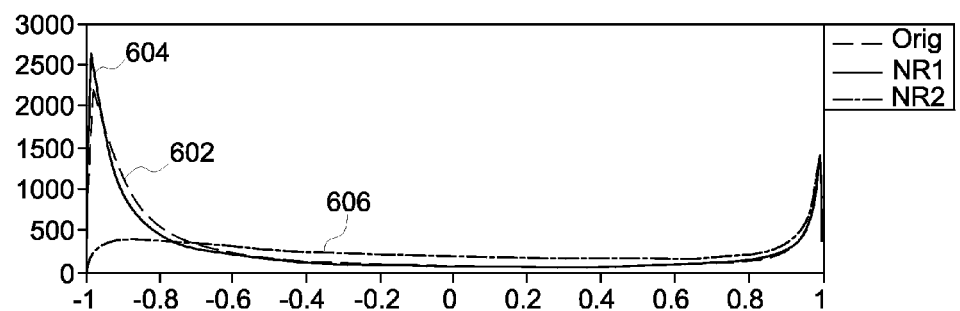
FIG. 6 are graphs illustrating noise reduction in histograms of neighborhood correlation in accordance with an embodiment.
Figure 6B:
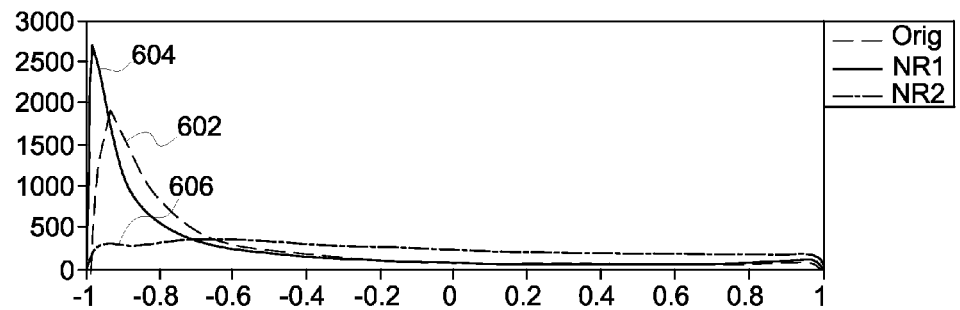

FIG. 6 are graphs illustrating noise reduction in histograms of neighborhood correlation in accordance with an embodiment. In particular, FIG. 6 illustrates the performance of a noise reduction process in histograms of neighborhood correlation for (a) head material density (MD) and (b) body MD images. In FIG. 6, the curve 602 represent the original data (Orig), the curve 604 represent noise reduction without correlation information (NR1) and the curve 606 represents noise reduction (NR2) using the correlation process of various embodiments. The original data curve 602 has a high negative correlated noise. Using an independent noise reduction process on each channel reduces the noise, but retains most of the correlated noise illustrated by curve 604. When noise reduction is performed using correlated noise as illustrated by the curve 606 and in accordance with various embodiments, improved noise reduction is achieved, while maintaining the signal mean.

Figure 7:
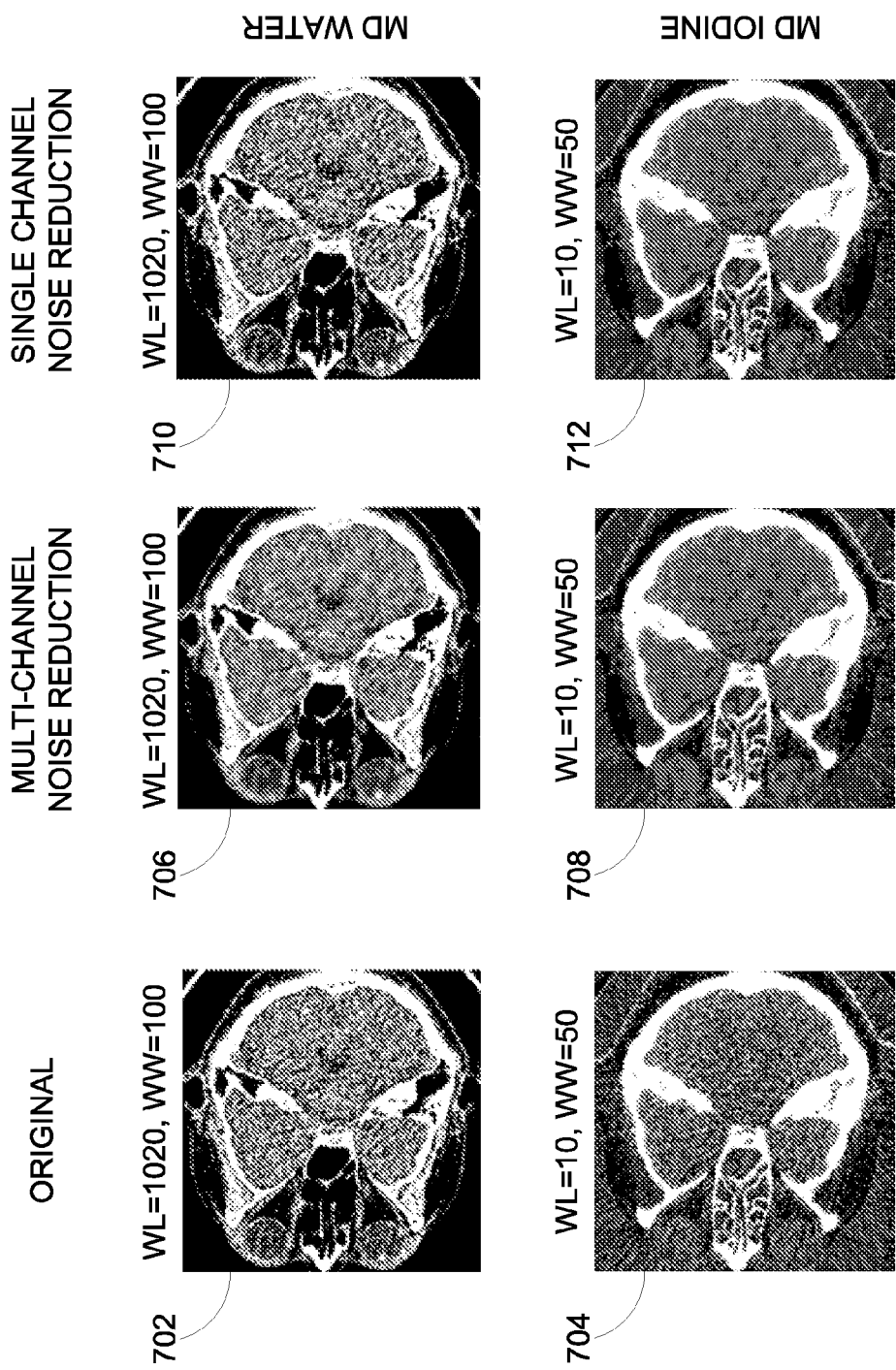
FIG. 7 are images illustrating noise reduction in accordance with an embodiment.
Figure 8:
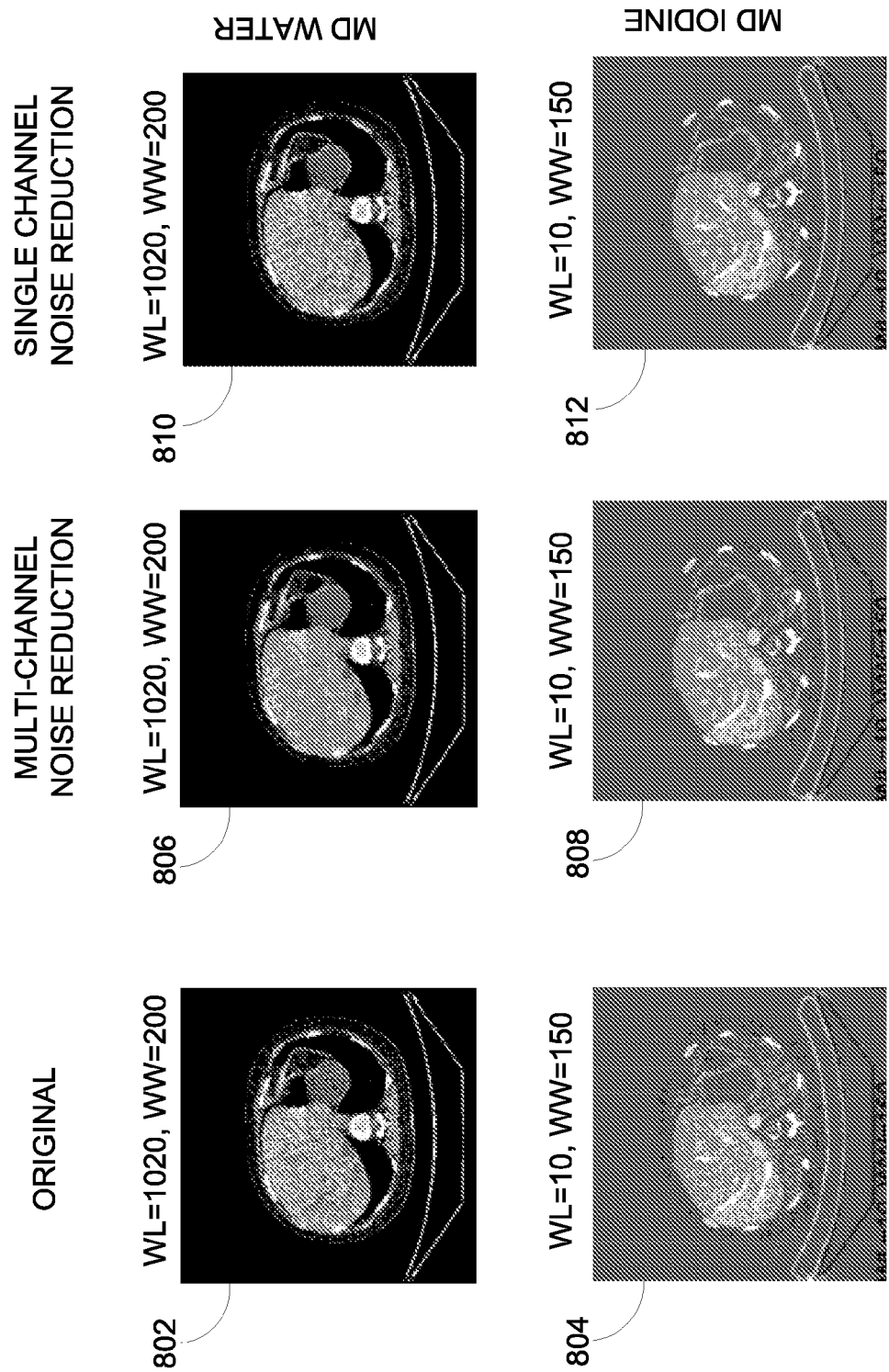
FIG. 8 are images illustrating noise reduction in accordance with an embodiment.

FIG. 7 and FIG. 8 are images illustrating noise reduction in accordance with an embodiment. FIG. 7 illustrates a noise reduction process in head MD images. FIG. 8 illustrates a noise reduction process in body MD images. The images shown are of the water (images 702, 706, and 710) and iodine (images 704, 708, and 712) material images in FIG. 7. The images shown are of the water (images 802, 806, and 810) and iodine (images 804, 808, and 812) material images in FIG. 8. From left to right the images correspond to original images (FIG. 7: 702 and 704; FIG. 8: 802 and 804), noise reduced images using various embodiments (FIG. 7: 706 and 708; FIG. 8: 806 and 808) and noise-reduced images not using the correlation information (FIG. 7: 710 and 712; FIG. 8: 810 and 812). As can be seen, the clarity and clinically relevant information in these images may be improved using the various embodiments.

Figure 9A:
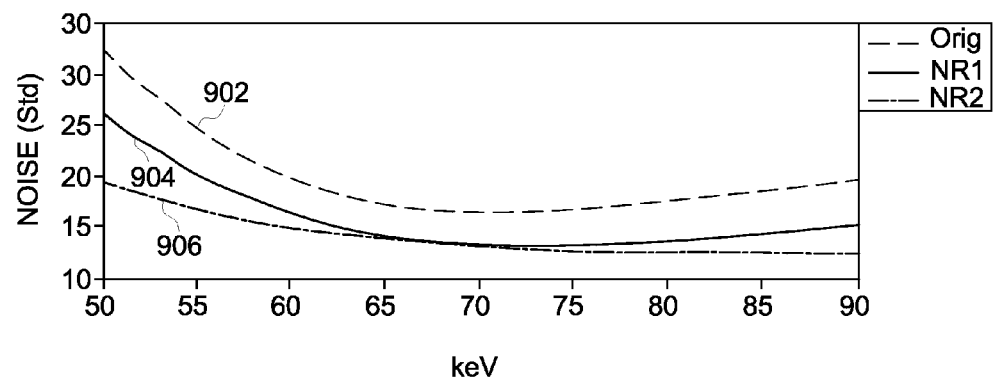
FIG. 9 are graphs illustrating noise reduction in plots of monochromatic images in accordance with an embodiment.
Figure 9B:
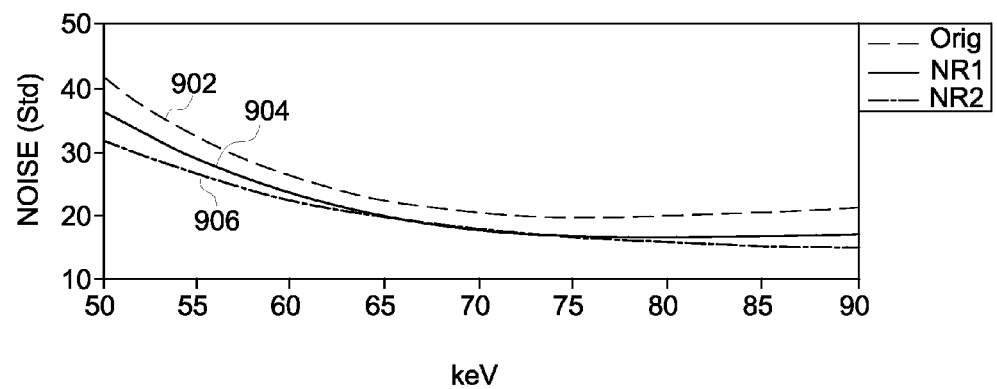

FIG. 9 are graphs illustrating noise reduction in plots of monochromatic images in accordance with an embodiment. In particular, FIG. 9 illustrates a noise reduction process in graphs 900a and 900b of monochromatic (a) head and (b) body images. The three curves represents an original data (Orig) curve 902, a curve 904 representing noise reduction without correlation information (NR1) and a noise reduced curve (NR2) 906 using various embodiments. Using one or more embodiments disclosed herein, at a particular (e.g., an optimal or desired) keV, the correlated noise is cancelled out. However, at all other keV levels the measured noise includes both correlated and uncorrelated noise. By using the neighborhood correlations as demonstrated in graph 900a, noise in monochromatic head images and in graph 900b, noise in monochromatic body, is further decreased. When using the non-correlated method of noise reduction, the resulting data is not optimized for noise reduction. As evident from the Orig curve 902 and the NR1 curve 904, the two curves are parallel to each other. The parallel curves illustrate that the noise reduction was merely averaging noise and not performing selective filtering based on optimal keV. Improved noise reduction is achieved when data is processed using correlation information as compared to processing without correlation information. In particular, the signal to noise ratio within 40-140 keV range is improved. Additionally, when reducing noise using a correlated image and in accordance with various embodiments, FIG. 9 shows that the noise reduction at 70 KeV is optimized.

Figure 10:
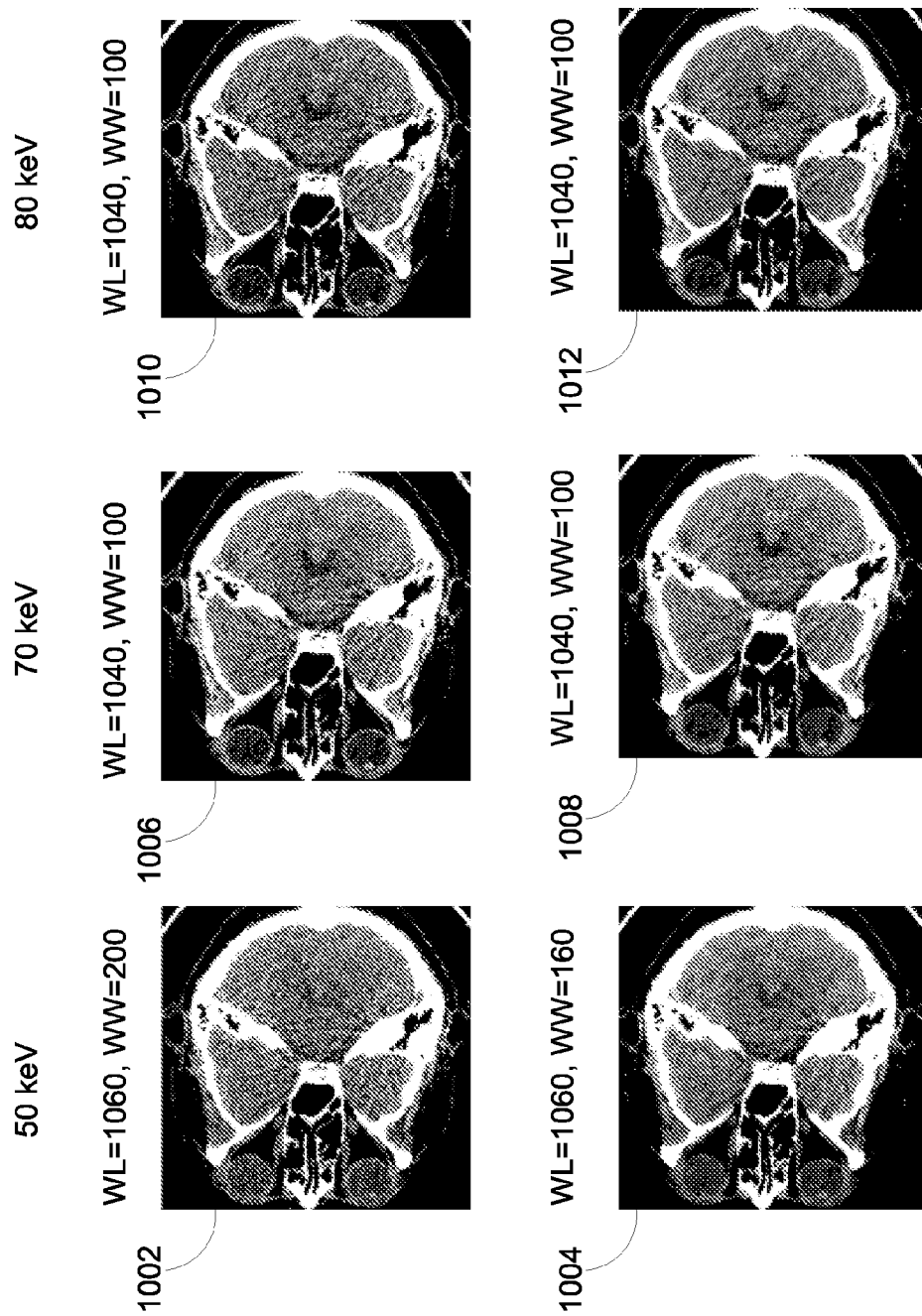
FIG. 10 are images illustrating noise reduction in accordance with an embodiment.
Figure 11:
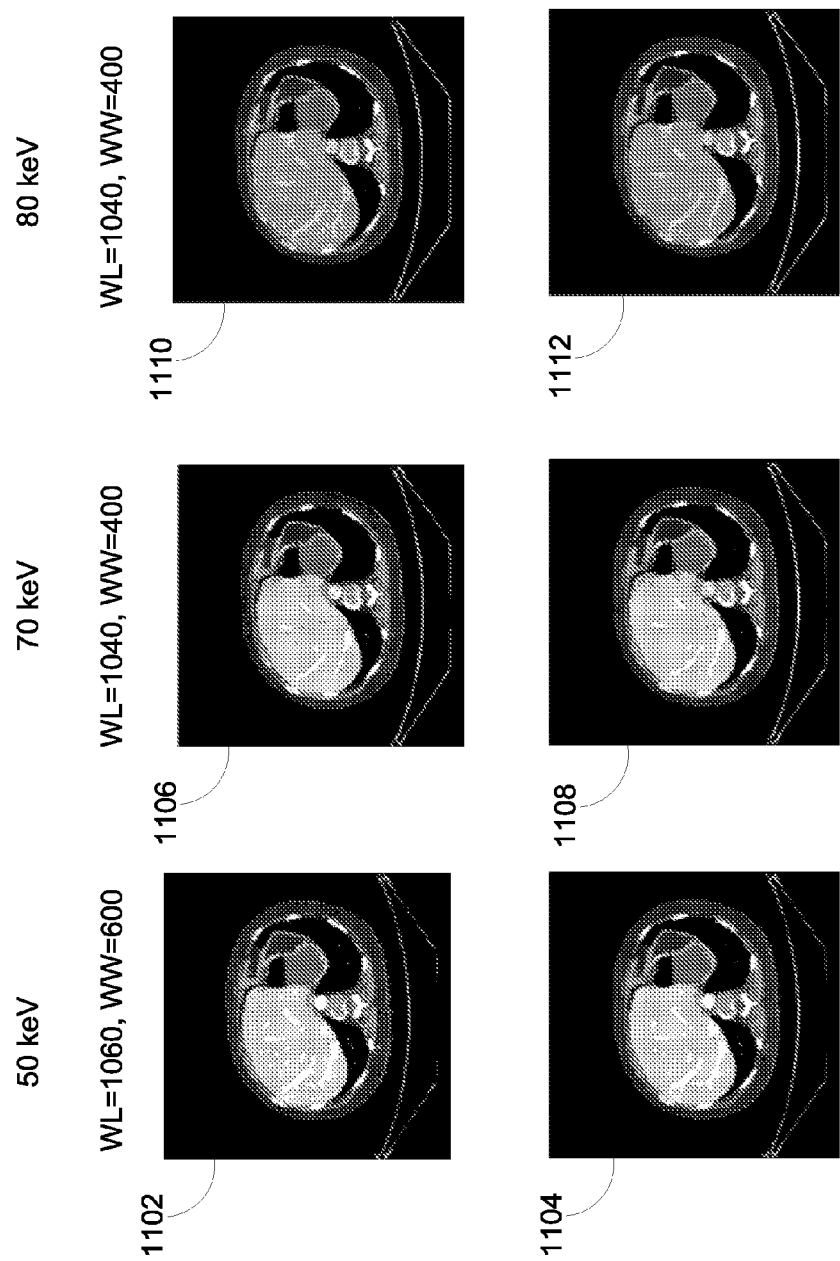
FIG. 11 are images illustrating noise reduction in accordance with an embodiment.

FIG. 10 and FIG. 11 are images illustrating noise reduction in accordance with an embodiment. FIG. 10 illustrates noise reduction in monochromatic head images. FIG. 11 illustrates noise reduction in monochromatic body images. FIG. 10 (Clinical head), FIG. 11 (Clinical Body) shows monochromatic images. The monochromatic images are generated at 50 keV (FIG. 10: 1002, 1004 and FIG. 11: 1102, 1104), at 70 keV (FIG. 10: 1006, 1008 and FIG. 11: 1106, 1108), and 80 keV (FIG. 10: 1010, 1012 and FIG. 11: 1110, 1112). Furthermore, the images are constructed using the original material images (FIG. 10: 1002, 1006. 1010 and FIG. 11: 1102, 1106. 1110) and noise reduced images using the various embodiments (FIG. 10: 1004, 1008. 1012 and FIG. 11: 1104, 1108. 1112). Again as can be, the clarity and clinically relevant information in these images may be improved using the various embodiments.

Figure 12:
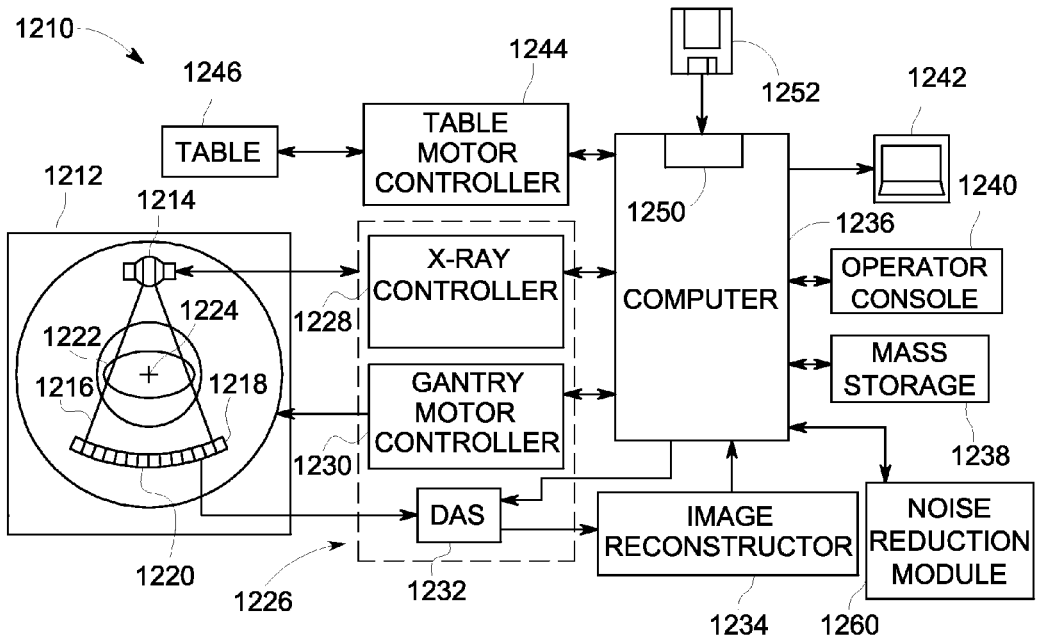
FIG. 12 is a block diagram of a Computed Tomography (CT) system with a noise reduction module in accordance with an embodiment.

FIG. 12 is a block diagram of a Computed Tomography (CT) system 1210 with a noise reduction module 1260 in accordance with an embodiment. The noise reduction module 1260 may be embodied as the noise reduction module 110 (shown in FIG. 1). The CT system 1210 includes a gantry 1212 having a x-ray source 1214 and a detector array 1218. The x-ray source 1214 projects a beam of x-rays 1216 toward the detector array 1218 on the opposite side of the gantry 1212. The detector array 1218 includes a plurality of detector elements 1220 that are arranged in rows and channels and that together sense the projected x-rays that pass through an object, such as the patient 1222.

Each detector element 1220 produces an electrical signal, or output, that represents the intensity of an impinging x-ray beam and hence allows estimation of the attenuation of the beam as the x-ray beam passes through the patient 1222. During a scan to acquire x-ray projection data, the gantry 1212 and the components mounted thereon rotate about a center of rotation 1224. FIG. 12 shows only a single row of detector elements 1220 (i.e., a detector row). However, the multislice detector array 1218 includes a plurality of parallel detector rows of detector elements 1220 such that projection data corresponding to a plurality of slices can be acquired concurrently during a scan.

The rotation of the gantry 1212 (and optionally movement of the x-ray source 1214) is governed by a control mechanism 1226 of the CT imaging system 1210. The control mechanism 1226 includes a radiation controller 1228 that provides power and timing signals to the x-ray source 1214 and a gantry motor controller 1230 that controls the rotational speed and position of the gantry 1212. A data acquisition system (DAS) 1232 in the control mechanism 1226 samples analog data from the detector elements 1220 and converts the data to digital signals for subsequent processing. An image reconstructor 1234 receives sampled and digitized radiation data from the DAS 1232 and performs high-speed image reconstruction. The reconstructed image is applied as an input to a computer 1236 that stores the image in a mass storage device 1238.

The computer 1236 also receives commands and scanning parameters from an operator via a console 1240 that has, for example, a keyboard and/or other user input device(s). An associated display system 1242 allows the operator to observe the reconstructed image and other data from the computer 1236. The operator supplied commands and parameters are used by the computer 1236 to provide control signals and information to the DAS 1232, the radiation controller 1228 and the gantry motor controller 1230. In addition, the computer 1236 operates a table motor controller 1244 that controls a motorized table 1246 to position the patient 1222 in the gantry 1212 or to move the patient 1222 along the z-axis. In particular, the table 1246 moves portions of the patient 1222 through the gantry opening 1248.

In one embodiment, the computer 1236 includes a device 1250, for example, a floppy disk drive, CD-ROM drive, or DVD-ROM drive, for reading instructions and/or data from a computer-readable medium 1252, such as a floppy disk, CD-ROM, or DVD. It should be understood that other types of suitable computer-readable memory are recognized to exist (e.g., CD-RW and flash memory, to name just two), and that this description is not intended to exclude any of these. In another embodiment, the computer 1236 executes instructions stored in firmware (not shown). Generally, a processor in at least one of the DAS 1232, the reconstructor 1234, and the computer 1236 shown in FIG. 12 is programmed to execute the processes described herein. However, the method is not limited to practice in the CT imaging system 1210 and can be utilized in connection with many other types and variations of imaging systems. In one embodiment, the computer 1236 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

A noise reduction module 1260 is configured to reduce noise in acquired signals using noise correlation between a plurality of channels. The noise reduction module 1260 is configured to remove signal noise based on the correlated noise coefficient. Additionally, the noise reduction module 1260 is configured in one embodiment to preserve an image edge in each of the plurality of channels. The noise reduction module 1260 is also configured in one embodiment to preserve an image mean in each of the plurality of channels. The noise reduction module 1260 in one embodiment may process multi-channel data in two or more dimensions. The noise reduction module 1260 is also configured in one embodiment to remove noise in a non-linear iterative process.

Figure 13:
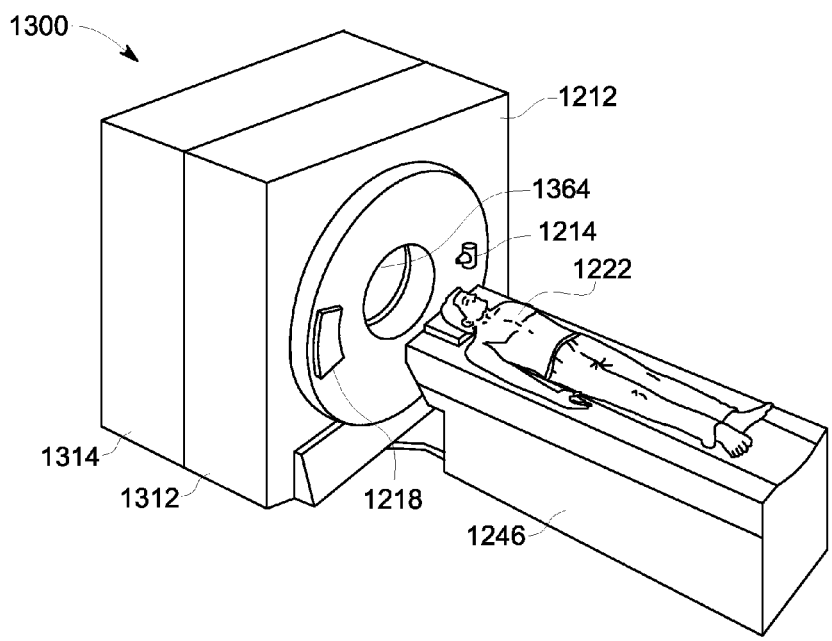
FIG. 13 illustrates a pictorial view of an exemplary multimodality imaging system formed in accordance with various embodiments.

FIG. 13 illustrates a pictorial view of an exemplary multi-modality imaging system formed in accordance with various embodiments. The multi-modality imaging system 1300 is illustrated and includes a first modality unit 1312 and a second modality unit 1314. The two modality units, 1312 and 1314, enable the system 1300 to scan a patient 1316 in a first modality using the first modality unit 1312 and to scan the patient 1316 in a second modality using the second modality unit 1314. The system 1300 allows for multiple scans in different modalities to facilitate an increased diagnostic capability over single modality systems. In one embodiment, the multi-modality imaging system 1300 is a Positron Emission Tomography/Computed Tomography (PET/CT) imaging system 1300. Optionally, modalities other than CT and PET are employed with system 1300. For example, the first modality 1312 may be a virtual computed tomography (VCT) imaging system. The first modality unit 1312, e.g. the CT/VCT imaging system may be configured similar to the CT imaging system 1210.

In the exemplary embodiment, the x-ray source 1214 and the detector array 1218 are rotated with the gantry 1212 within the imaging plane and around the patient 1222 to be imaged such that the angle at which the x-ray beam intersects the patient 1222 constantly changes. A group of x-ray attenuation measurements, i.e., projection data, from the detector array 1218 at one gantry angle is referred to as a "view". A "scan" of the patient 1222 includes a set of views made at different gantry angles, or view angles, during one revolution of the x-ray source 1214 and the detector array 1218.

The x-ray source 1214 may be configured to perform a scan of the patient 1222 using a single x-ray energy. Optionally, the x-ray source 1214 may be configured to perform a scan of the patient 1222 using a multiple energy levels For example, in a dual energy scan, data is collected using two different x-ray spectra, corresponding to different kV levels. The dual energy data allows improved differentiation, characterization, isolation and ability to distinguish the imaged material. Additionally, the information from the two energy spectra may be utilized to reduce beam hardening artifacts. Such artifacts are encountered, for example in cranial scanning. Further, noise reduction helps improve the fidelity of the signal and improve the contrast to noise ratio measured using the CT number of an object, such as a portion of the patient 1222.

A technical effect of at least one embodiment is reduced correlated noise for a multi-channel signal while preserving one or more image features.

Thus, a dual energy CT system may be an imaging modality where noise reduction using the various embodiments disclosed herein can be used. One example of such a dual energy system is a diagnostic spectral imaging system. For example, calcified plaque in the cardiovascular vessels and stents impede the radiologist's ability to make an accurate diagnosis. A spectral imaging system reduces the calcium blooming artifacts and provides image clarity to view the stents. In addition, spectral imaging systems provide additional information to help characterize small lesions. Through water-iodine material density pairs, spectral imaging helps clinicians determine whether a lesion enhances with IV contrast. Using material decomposition, spectral imaging helps physicians characterize small lesions for the presence or absence of contrast enhancement for diagnosis. These images are improved or enhanced using the noise reduction methods of one or more embodiments.

In a CT scan, the projection data is processed to reconstruct an image that corresponds to a two dimensional slice taken through the patient 1222. One method for reconstructing an image from a set of projection data is referred to in the art as the filtered back projection technique. This process converts the integral attenuation measurements into an image representing attenuation of the patient in each pixel. The attenuation measurements are typically converted into units of CT numbers or Hounsfield units.

Various embodiments may be implemented in connection with different types of imaging systems. For example, various embodiments may be implemented in connection with a CT imaging system in which an x-ray source projects a fan-shaped beam that is collimated to lie within an X-Y plane of a Cartesian coordinate system and generally referred to as an "imaging plane." The x-ray beam passes through an object being imaged, such as a patient. The beam, after being attenuated by the object, impinges upon an array of radiation detectors. The intensity of the attenuated radiation beam received at the detector array is dependent upon the attenuation of an x-ray beam by the object. Each detector element of the array produces a separate electrical signal that is a measurement of the beam intensity at the detector location. The intensity measurement from all the detectors is acquired separately to produce a transmission profile.

In CT systems, the x-ray source and the detector array are rotated with a gantry within the imaging plane and around the object to be imaged such that the angle at which the x-ray beam intersects the object constantly changes. A complete gantry rotation occurs when the gantry concludes one full 360 degree revolution. In an axial scan (e.g., a step-and-shoot axial scan), the projection data is processed to construct an image that corresponds to a two-dimensional slice taken through the object. One method for reconstructing an image from a set of projection data is referred to in the art as a filtered back projection technique. This process converts the attenuation measurements from a scan into integers called "CT numbers" or "Hounsfield units" (HU), which are used to control the brightness of a corresponding pixel on a display (e.g., cathode ray tube or liquid crystal display).

To reduce the total scan time, a "helical" scan may be performed. To perform a "helical" scan, a patient or object (e.g., baggage) is moved while the data for a prescribed number of slices is acquired. Such a system generates a single helix from a fan beam helical scan. The helix mapped out by the fan beam yields projection data from which images in each prescribed slice may be reconstructed.

To reduce the total scan time, a "helical" scan may be performed. To perform a "helical" scan, the patient 1316 is moved while the data for the prescribed number of slices is acquired. Such a system generates a single helix from a fan beam helical scan. The helix mapped out by the fan beam yields projection data from which images in each prescribed slice may be reconstructed. Multiple helices are obtained using a multi-slice detector.

Reconstruction processes for helical scanning typically use helical weighing processes that weight the collected data as a function of view angle and detector channel index. Specifically, prior to the filtered back projection process, the data is weighted according to a helical weighing factor that is a function of both the gantry angle and detector angle. The weighted data is then processed to generate CT numbers and to construct an image that corresponds to a two dimensional slice taken through the patient 16. During operation of multi-slice PET/CT system 1300, multiple projections are acquired concurrently with multiple detector rows. Similar to the case of helical scan, weighting functions are applied to the projection data prior to the filtered back projection process.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A multichannel system comprising:
an acquisition portion configured to acquire a multichannel signal including image data and signal noise; and
a multichannel noise reduction module configured to obtain correlated noise between a plurality of channels within the multichannel signal, the correlated noise comprising correlation information associating noise between at least two channels;
the multichannel noise reduction module configured to obtain at least one of a signal characteristic or uncorrelated noise from at least one of the plurality of channels; and
the multichannel noise reduction module configured to remove the signal noise from a select channel in the multichannel signal based on i) the correlated noise and ii) at least one of the uncorrelated noise or the signal characteristic associated with the select channel.

2. The system of claim 1, wherein the noise reduction module is configured to preserve one or more signal characteristics in each of the plurality of channels.

3. The system of claim 2, wherein the signal characteristic includes at least one of a local mean, an edge or a curvature.

4. The system of claim 1, wherein the noise reduction module is configured to determine an initial correlation coefficient based on a calculation of a channel signal in at least two dimensions.

5. A system of claim 4, wherein the initial correlation coefficient is predicted.

6. A system of claim 4, wherein the initial correlation coefficient is a cross correlation estimate.

7. The system of claim 1, wherein the noise reduction module is configured to determine a correlation based on noise source.

8. The system of claim 1, wherein the noise reduction module is configured to determine a correlation based on neighborhood information.

9. The system of claim 1, wherein the multichannel system is a dual energy x-ray system.

10. The system of claim 1, wherein the noise reduction module is further configured to remove noise in a non-linear iterative process.

11. The system of claim 1, wherein the obtained signal characteristic comprises edge information for an image.

12. The method of claim 1, wherein the uncorrelated noise comprises a random signal with a flat power spectral density.

13. A non-transitory computer readable medium for reducing signal noise in a multichannel system using a processor, the non-transitory computer readable medium including instructions to command the processor to:
   acquire a multichannel signal including image data and signal data;
   obtain a noise correlation between a plurality of channels within the multichannel signal, the noise correlation comprising correlation information associating noise between at least two channels;
   obtain at least one of a signal characteristic or an uncorrelated noise from at least one of the plurality of channels; and
   remove the signal noise from a select channel in the multichannel signal based on (i) the correlated noise and (ii) at least one of a uncorrelated noise in each channel or the obtained signal characteristic in each channel.

14. The non-transitory computer readable medium of claim 13, wherein the instructions command the processor to preserve an image mean in each of the plurality of channels.

15. The non-transitory computer readable medium of claim 13, wherein the instructions command the processor to determine an initial correlation coefficient based on a calculation of a channel signal in at least two dimensions.

16. The non-transitory computer readable medium of claim 13, wherein the instructions command the processor to determine a correlation based on neighborhood information.

17. The non-transitory computer readable medium of claim 13, wherein the instructions command the processor to remove noise in a non-linear iterative process.

18. The non-transitory computer readable medium of claim 13, wherein the obtained signal characteristic comprises edge information for an image.

19. A method for multichannel noise reduction, the method comprising:
   acquiring a multichannel signal including image data and signal noise;
   obtaining a noise correlation between a plurality of channels within the multichannel signal, the noise correlation comprising correlation information associating noise between at least two channels;
   obtaining at least one of a signal characteristic or an uncorrelated noise from at least one of the plurality of channels; and
   removing the signal noise from a select channel in the multichannel signal based on (i) the correlated noise and (ii) at least one of a uncorrelated noise in each channel or the obtained signal characteristic in each channel.

20. The method of claim 19, further comprising preserving one or more signal characteristics in each of the plurality of channels.

21. The method of claim 20, wherein the signal characteristics include at least one of a local mean, an edge or a curvature.

22. The method of claim 19, further comprising determining an initial correlation coefficient based on a calculation of a channel signal in at least two dimensions.

23. The method of claim 19, further comprising determining a correlation based on neighborhood information.

\* \* \* \* \*